(12) United States Patent
Miyamoto

(10) Patent No.: US 6,395,634 B1
(45) Date of Patent: May 28, 2002

(54) GLASS SUBSTRATE FOR MAGNETIC RECORDING MEDIUM, MAGNETIC RECORDING MEDIUM, AND METHOD OF MANUFACTURING THE SAME

(75) Inventor: Takemi Miyamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/540,888

(22) Filed: Mar. 31, 2000

(30) Foreign Application Priority Data

Mar. 31, 1999 (JP) .......................................... 11-094378

(51) Int. Cl.⁷ ..................... H01L 21/302; H01L 21/461; C03C 15/00
(52) U.S. Cl. ....................... 438/691; 438/690; 438/756; 216/97; 65/30.14
(58) Field of Search ................................. 438/481, 478, 438/691, 690, 756, 723, 743; 428/1.32; 218/80, 97; 65/30.14, 30.1

(56) References Cited

U.S. PATENT DOCUMENTS 4,833,001 A  * 5/1989 Kijima et al. ................ 428/141
5,681,609 A  * 10/1997 Kitayama et al. ............ 427/129
5,861,930 A  *  1/1999 Sakai .......................... 349/106

FOREIGN PATENT DOCUMENTS

| JP | 62-273619 | 11/1987 |
| JP | 04-62413 | 10/1992 |
| JP | 07-153059 | 6/1995 |
| JP | 07-101507 | 11/1995 |

* cited by examiner

Primary Examiner—Amir Zarabian
Assistant Examiner—Adam Pyonin
(74) Attorney, Agent, or Firm—Sughrue Mion, PLLC

(57) ABSTRACT

In a method of manufacturing a glass substrate for a magnetic recording medium for forming a predetermined roughness, a principal surface of the glass substrate is precisely polished by the use of polishing material containing free abrasive grain. Remaining stress distribution for a portion of a polishing trace due to the free abrasive grain is generated on the surface of the glass substrate. A surface process is performed for at least the principal surface of the glass substrate by the use of hydrosilicofluoric acid. A portion having relatively high remaining distortion in the generated remaining stress distribution is decided as an island portion. The glass substrate is heated after precisely polishing before performing the surface process by the use of the hydrosilicofluoric acid.

10 Claims, 1 Drawing Sheet

GLASS SUBSTRATE FOR MAGNETIC RECORDING MEDIUM, MAGNETIC RECORDING MEDIUM, AND METHOD OF MANUFACTURING THE SAME

BACKGROUND OF THE INVENTION

This invention relates to a glass substrate for use in a magnetic recording medium, such as, a hard disk, a magnetic recording medium having the glass substrate, and a method of manufacturing the magnetic recording medium and the glass substrate.

An interface between a magnetic head and a magnetic disk has become a key technology for improving recording capacity in a technical field for magnetically recording (writing) and reproducing (reading).

It is necessary to excessively reduce a flying height of the magnetic head which is float over a surface of the magnetic disk to improve recording density.

However, when the record/reproduce (write/read) operation is carried out in the known CSS (Contact Start Stop) method, the magnetic head often sticks to the magnetic disk with a low flying height of the magnetic head. Herein, it is to be noted that this phenomenon is generally called "head stiction".

Suggestions conventionally have been made about a variety of texture techniques to prevent such stiction of the magnetic head. A representative suggestion has been made about a method of forming a surface of an Al/NiP plating substrate into a rough surface by mechanically polishing (mechanically texturing) the surface in Japanese Unexamined Patent Publication (JP-A) No. S62-273619. Further, another suggestion has been made about a method of depositing a thin-film having the rough surface on a glass substrate by the use of the known sputtering process in Japanese Examined Patent Publication (JP-B) No. H04-62413 or a method of forming the rough surface by the use of the chemical etching process in Japanese Examined Patent Publication (JP-B) No. H07-101507, Japanese Examined Patent Publication (JP-B) No. H07-153059 when the glass substrate is superior in flatness in comparison with an aluminum substrate.

In particular, an etching process is carried out by the use of etching liquid after performing a moisture and heat insulation process for a glass substrate in Japanese Examined Patent Publication (JP-B) No. H07-153059. Thereby, repeatability of formation of projections and uniformity of a projection height, which conventionally have caused problems in the texturing technique due to the chemical etching method, have been improved.

Meanwhile, a glide height recently has reached $1.2\mu$ inch or less to improve the recording capacity.

However, the method of forming the texture, which has been conventionally suggested and described above, is the texture technique on the condition that the glide height is equal to about $8\mu$ inch.

Therefore, even when the conventional texture forming method is applied for the recent magnetic disk which records (writes) and reproduces (reads) with the low flying height, it is difficult to obtain the magnetic disk which simultaneously satisfies sufficient electromagnetic conversion characteristic and stiction preventing effect of the magnetic head.

In this case, the conventional glide height was equal to about $8\mu$ inch. Therefore, the surface state (the surface morphology) of the magnetic disk (the substrate) could be sufficiently evaluated by the known thally step. Herein, the surface roughness is measured by scanning a contact needle having radius of several $\mu$m (for example, 2.5 $\mu$m) along the surface.

However, when the flying height becomes $1.2\mu$ inch or less (1 inch=25.4 mm) which is recently required, it is difficult to judge whether or not the surface state of the glass substrate can realize prevention of the stiction of the magnetic head by the use of the conventional thally step.

In the meantime, attention recently has been paid for a magnetic disk apparatus of a load/unload system (a ramp load system) in stead of the CSS system. In such a load/unload system, a magnetic head travels on a data area of the magnetic disk via an arm after the magnetic disk is rotated and is driven different from the CSS system.

Consequently, it is unnecessary to provide the texture for preventing the stiction when the magnetic head halts. Further, the surface roughness of the disk surface becomes small, and the flying height of the magnetic head for the magnetic disk also becomes small. As a result, it is possible to reproduce with high recording density.

Thus, it is required that the medium surface is flat, the projection height is low, and variation of the projection heights is small (values of Rmax/Ra and Rp/Ra are small) in the load/unload system (ramp load system) in comparison with the CSS system.

Specifically, it is necessary that Rmax falls within the range between 3 and 15 nm, Ra falls within the range between 0.2 and 2.5 nm, Rmax/Ra falls within the range between 3 and 15, or Rp falls within the range between 1 and 7 nm, Ra falls within the range between 0.2 and 2.5 nm, and Rp/Ra falls within the range between 1 and 15.

In this case, the surface preferably has projections within the above-mentioned range, and is not completely flat in the load/unload system. In particular, Ra preferably falls within the range between 0.6 and 1.3 nm.

In the meantime, the surface roughness required for the CSS system is specified by Rmax=6–18 nm, Ra=0.7–1.5 nm, and Rmax/Ra=10–20. Further, the surface roughness is specified by Rp=3–15 nm, Ra=0.7–1.5 nm, and Rp/Ra=3–15 when the surface roughness is controlled by Rp.

SUMMARY OF THE INVENTION

It is therefore an object of this invention to provide a magnetic recording medium and a glass substrate for the magnetic recording medium which is capable of realizing a glide height of $1.2\mu$ inch or less and which is capable of realizing high electromagnetic characteristic.

It is another object of this invention to provide a magnetic recording medium and a glass substrate for the magnetic recording medium which is suitable for a load/unload system by controlling a projection height, projection density, variation of projection heights, and variation of projections and which has high CSS durability characteristic suitable for a CSS system.

Inventors have paid attention to specify the surface state of the glass substrate by the use of the interatomic force microscope (AFM) in order to evaluate the surface state of the glass substrate. This is because it is impossible to identify whether or not the surface state of the glass substrate is suitable, since the resolution is low in the conventional measuring method using the contact needle method.

Based upon the above-mentioned evaluation method, it has been confirmed that height and distribution (namely, variation of the height) of each projection of fine roughness, which are formed on a principle surface of the glass substrate, are important factors to achieve the above purpose.

Further, as a result of various experiments, it has been found out that the glass substrate surface as a target or a goal can not be obtained unless specific polishing condition and surface process condition are properly combined. This invention is performed based upon this analyzed result.

Specifically, inventors have discovered that the trace, along which the abrasive grain passes, tends to be formed as the island (peak) when the surface is processed by the hydrosilicofluoric acid (which may be referred to as hydrofluosilic acid or hexafluorosilicic acid) after polishing by the polishing material containing the free abrasive grain.

Although this mechanism is not clear, the load in the polishing step by the free abrasive grain is applied to the surface of the glass substrate. Consequently, the network of Si—O is (systematically and) structurally changed, and nonuniformity occurs in the remaining stress distribution by the structural change.

As a result, the etching rate due to the hydrosilicofluoric acid becomes slow in the portion having relatively high remaining distortion (namely, a trace portion along which the free agrasive grain passes). This is assumed to be the above-mentioned mechanism.

An application is previously filed on the basis of this analyzed result in Japanese Patent Application No. H10-233261.

It has been found out that the projection height can be reduced, and the projection density can be reduced by heating the glass substrate before processing the surface by the hydrosilicofluoric acid in addition to the above-mentioned analyzed result. Thereby, this invention has been completed.

(First Invention)

In a method of manufacturing a glass substrate for a magnetic recording medium for forming a predetermined roughness according the first invention, a principal surface of the glass substrate is precisely polished by the use of polishing material containing free abrasive grain.

Thereby, remaining stress distribution for a portion of a polishing trace due to the free abrasive grain is generated on the surface of the glass substrate.

Subsequently, a surface process is performed for at least the principal surface of the glass substrate by the use of hydrosilicofluoric acid.

Thereby, a portion having relatively high remaining distortion in the generated remaining stress distribution is decided as an island portion.

In this case, the glass substrate is heated after precisely polishing before performing the surface process by the use of the hydrosilicofluoric acid.

(Second Invention)

In a method of manufacturing a glass substrate for a magnetic recording medium for forming a predetermined roughness according the second invention, a principal surface of the glass substrate is precisely polished by the use of polishing material containing free abrasive grain.

Thereby, remaining stress distribution for a portion of a polishing trace due to the free abrasive grain is generated on the surface of the glass substrate.

Subsequently, a chemical processing (which may be referred to as chemical surface process) is performed for at least the principal surface of the glass substrate by use of hydrosilicofluoric acid.

Thereby, a portion having relatively high remaining distortion In the generated remaining stress distribution is decided as an island portion.

In this case, the glass substrate is heated by dipping the glass substrate in heated solvent after precisely polishing before chemically processing the surface.

(Third Invention)

The chemical surface process comprises either one of an etching process by the use of solution containing hydrofluoric acid, solution containing hydrosilicofluoric acid, and alkali solution in the second invention.

(Fourth Invention)

Heating temperature in the heating process step falls within the range between 30° C. and 180° C. in any one the first invention through the third invention.

(Fifth Invention)

The heating process is carried out by the use of at least one selected the group consisting of hot water, heated sulfuric acid, heated glycerin, and heated phosphoric acid in any one of the first invention through the fourth invention.

(Sixth Invention)

The glass substrate contains at least alkali metal oxide and alkali earth oxide, and the content of the alkali earth oxide is not exceeding 3 mol % in any one of the first invention through the fifth invention.

(Seventh Invention)

The glass constituting the glass substrate contains $SiO_2$ between 58 and 75 weight %, $Al_2O_3$ between 5 and 23 weight %, $Li_2O$ between 3 and 10 weight %, and $Na_2O$ between 4 and 13 weight % as main components in the sixth invention.

(Eighth Invention)

The glass contains $SiO_2$ between 62 and 75 weight %, $Al_2O_3$ between 5 and 15 weight %, $Li_2O$ between 4 and 10 weight %, $Na_2O$ between 4 and 12 weight %, and $ZrO_2$ between 5.5 and 15 weight % as main components, and the weight ratio of $Na_2O/ZrO_2$ falls within the range between 0.5 and 2.0 while weight ratio of $Al_2O/ZrO_2$ falls within the range between 0.4 and 2.5 in the seventh invention.

(Ninth Invention)

The chemical strengthening process is carried out after the surface process due to the hydrosilicofluoric acid in any one of the first invention through the eighth invention.

(Tenth Invention)

In a method of manufacturing a magnetic recording medium, at least a magnetic layer is formed on the principal surface of the glass substrate manufactured by the method claimed in any one of the first invention through the ninth invention.

(Eleventh Invention)

In a glass substrate for a magnetic recording medium for use in a load/unload system, the glass substrate has a principal surface, and surface roughness of the principal surface is specified by Rmax=3–15 nm, Ra=0.2–2.5 nm, and Rmax/Ra=3–15.

In this event, Ra is representative of a center-line mean roughness, and Rmax is defined as a maximum height representative of a difference between a highest point and a lowest point.

(Twelfth Invention)

In a glass substrate for a magnetic recording medium for use in a load/unload system, the glass substrate has a principal surface, and surface roughness of the principal surface is specified by Rp=1–7 nm, Ra=0.2–2.5 nm, and Rp/Ra=1–15.

In this case, Ra is representative of a center-line mean roughness, and Rp is representative of a maximum height of a highest point.

(Thirteenth Invention)

In a magnetic recording medium having at least a magnetic layer on a glass substrate for use in a load/unload system, the glass substrate has a principal surface, and surface roughness of the principal surface is specified by Rmax=3–15 nm, Ra=0.2–2.5 nm, and Rmax/Ra=3–15.

In this event, Ra is representative of a center-line mean roughness, and Rmax is defined as a maximum height representative of a difference between a highest point and a lowest point.

(Fourteenth Invention)

In a magnetic recording medium having at least a magnetic layer on a glass substrate for use in a load/unload system, the glass substrate has a principal surface, and surface roughness of the principal surface is specified by Rp=1–7 nm, Ra=0.2–2.5 nm, and Rp/Ra=1–15.

In this event, Ra is representative of a center-line mean roughness, and Rp is representative of a maximum height of a highest point.

According to the first invention, the glass substrate is heated after the polishing process due to the free abrasive grain before performing the surface process by the use of the hydrosilicofluoric acid.

Thereby, the remaining distortion, which is generated on the surface of the glass substrate by the polishing process due to the free abrasive grain, is relieved.

Consequently, the projection height can be reduced in comparison with such a case that the heating process is not carried out. Further, the projection density, the variation of the projection heights, and the variation of the projections can be reduced.

Therefore, the magnetic recording medium, which is suitable for the load/unload system, can be stably manufactured by controlling the projection height and the projection density, and the variation of the projection heights. In such a load/unload system, the projection height and the projection density, and the variation of the projection heights fall within the predetermined range.

Further, the magnetic recording medium, which satisfies the high CSS durability characteristic and which is suitable for the CSS system, can be stably manufactured.

As mentioned above, inventors have discovered that the trace, along which the abrasive grain passes, tends to be formed as the island (peak) when the surface is processed by the hydrosilicofluoric acid after polishing by the polishing material containing the free abrasive grain.

Although this mechanism is not clear, the load in the polishing step by the free abrasive grain is applied to the surface of the glass substrate. Consequently, the network of Si—O is (systematically and) structurally changed, and nonuniformity occurs in the remaining stress distribution by the structural change. Herein, the nonuniformity means that the remaining distortion of the portion of the trace, along which the free abrasive grain passes, becomes large in comparison with the remaining distortion of the peripheral portion of the trace.

As a result, the etching rate due to the hydrosilicofluoric acid becomes slow in the portion having relatively high remaining distortion (namely, a trace portion along which the free agrasive grain passes). This is assumed to be the above-mentioned mechanism.

Moreover, the heating process is carried out before performing the surface process by the use of the hydrosilicofluoric acid. Thereby, the remaining distortion is relieved, and the difference of the etching rate caused by the remaining distortion becomes small.

Consequently, the projection density and the variation of the projection heights, which give an affect for flying travel of the magnetic head, are reduced in comparison with such a case (see FIG. 1) that the heating process is not carried out, and further, a fine projection having a low projection height is formed, as illustrated in FIG. 2.

In this case, when process conditions (concentration, temperature, dipping time) due to the hydrosilicofluoric acid are changed, the projection height can be controlled to a certain degree. However, the projection density can not be controlled.

Therefore, it is preferable to perform the heating process before the process due to the hydrosilicofluoric acid like this invention compared to this method because the projection height and density can stably and accurately controlled for the low flying travel of the magnetic head.

Namely, the remaining distortion due to the free abrasive grain formed on the surface of the glass substrate is relieved by the heating process before the process due to the hydrosilicofluoric acid.

Consequently, the projection is not formed in the region having a relatively small remaining distortion due to the polishing step.

On the other hand, the remaining distortion becomes small, and the height of the formed projection becomes small in the region having a relatively high remaining distortion. The projection density can be changed by controlling the condition of the heating process.

The method of the heating process in the first invention is not particularly restricted. There are exemplified a method in which the glass substrate is dipped in the heated solvent, a method in which the glass substrate is subjected in atmosphere (air, vacuum) heated by an oven and a method in which a light ray (for example, wavelength (infrared rays and ultraviolet rays) which absorbs for the glass substrate) is irradiated for the glass substrate as the heating process.

Among them, the method, in which the glass substrate is dipped in the heated solvent, and particles for the glass substrate can be removed at the same time with the heating process, is superior from the viewpoint of quality and stability.

This is because when the particles exist on the surface of the glass substrate during the process due to the hydrosilicofluoric acid, only the portion of the particles is left without the etching to form the projection, and the surface roughness is not reduced on the whole.

Further, the remaining polishing material causes to form the projection. Therefore, it is desirable that the remaining polishing material can be simultanousely removed by the solvent. Such solvent includes sulfuric acid and organic acid (phosphoric acid, formic acid, acetic acid, propionic acid, acrylic acid, oxalic acid, glycolic acid, glyceric acid, lactic acid, gluconic acid, succinic acid, adipic acid, and the like).

Further, the hydrosilicofluoric acid used during processing the surface of the glass substrate of this invention has weak etching force (slow etching rate) as compared to hydrofluoric acid solution which contains hydrofluoric acid or potassium fluoride and which is conventionally used as the etching liquid.

Consequently, it is possible to precisely control the surface roughness. Silicofluoric acid ($H_2SiF_6$) is typically used as the hydrosilicofluoric acid.

The hydrosilicofluoric acid process may contain the other acid (hydrofluoric acid, sulfuric acid, hydrochloric acid, nitric acid) and commercially available washing materiel (natural washing material, surfactant, alkali washing material) with fine quantity in order to enhance the etching (washing) effect.

Further, the process condition of the hydrosilicofluoric acid is mainly determined in dependency upon concentration of the hydrosilicofluoric acid, immersing time into the hydrosilicofluoric acid, temperature of the hydrosilicofluoric acid.

The hydrosilicofluoric acid is formed by dissolving the silicofluoric acid into water. The concentration of the hydrosilicofluoric acid indicates the concentration in which the silicofluoric acid is dissolved in the water.

The concentration and the temperature of the hydrosilicofluoric acid relate with the etching rate (the specific range will be explained later) while the immersing time into the hydrosilicofluoric acid relates with the obtained roughness and the process time of the step.

The process condition of the above-mentioned hydrosilicofluoric acid is suitably adjusted based upon the roughness of the formed surface roughness. However, it is preferable from controllability of the surface roughness that the immersing time into the hydrosilicofluoric acid falls within the range between 50 and 600 sec and the temperature of the hydrosilicofluoric acid falls within the range between 15° C. and 60° C.

The concentration of the hydrosilicofluoric acid preferably falls within the range between 0.15 and 3.0 weight %.

When the concentration of the hydrosilicofluoric acid is not exceeding 0.15 weight %, the etching effect or the washing effect for the glass substrate is lowered. Consequently, the desired surface roughness can not be obtained.

When the concentration exceeds 3.0 weight %, it is difficult to control the surface roughness with high accuracy because the etching rate became quick. Consequently, the glass substrate for the magnetic recording medium having stable quality can not be obtained. This is not preferable.

Inventors have found out that the surface roughness of the glass substrate before the surface process gives large effect for the height distribution (variation) of the islands (peaks) on the substrate surface which is finally obtained to stably manufacture the glass substrate for the magnetic disk of this invention which is required to be controlled the surface roughness with high accuracy.

Inventors have enthusiastically researched this case. As a result, it is preferable that the surface of the glass substrate before the surface process is in the mirror state. Specifically, it is found out that Ra falls within the range between 0.1 and 1.0 nm, more preferably, that Ra falls within the range between 0.1 and 1.0 nm, and Rmax falls within the range between 1 and 20 nm.

According to the second invention, the glass substrate is heated by dipping the glass substrate in heated solvent after precisely polishing before chemically processing the surface.

Thereby, the magnetic recording medium, which can realize the glide height of the 1.2$\mu$ inch or less and realize the high electro-magnetic conversion characteristic, can be stably manufactured from the same reason as the first invention.

In this case, the etching material used for the chemical surface process is not particularly restricted. There are exemplified a method (dipping, spraying and the like) which utilizes etching liquid, such as, hydrofluoric acid, hydrosilicofluoric acid, hydrofluoric acid-fluoride mixed solution, hydrofluoric acid-inorganic acid mixed solution, and hydrofluoric acid-organic mixed solution, and a method in which the etching process is performed by contacting vapor of the hydrofluoric acid with the surface of the glass substrate.

As mentioned before, the chemical surface process or the surface process due to the hydrosilicofluoric acid is carried out such that the portion having relatively high remaining distortion in the remaining stress distribution generated for the portion of the trace due to the free abrasive grain in the polishing process of the glass substrate is decided as the island portion.

This invention positively utilizes such phenomenon, and thereby, the a predetermined surface roughness can be obtained. Further, the predetermined surface roughness can be realized by performing the heating process. Although this mechanism has been described before, the other mechanism, which may occur this phenomenon, is naturally within the scope of this invention.

According to the third invention, the glass substrate is dipped in the heated solvent of the solution containing hydrofluoric acid, the solution containing hydrosilicofluoric acid, and the alkali solution in the second invention. This method can remove the particles for the glass substrate at the same time with the heating process, and is superior in the quality and stability from the same reason as the above.

In this case, cerium oxide ($CeO_2$), alumina ($Al_2O_3$), colloidal silica ($SiO_2$), iron oxide ($Fe_2O_3$), chromium oxide ($Cr_2O_3$), zirconium oxide ($ZrO_2$), titanium oxide ($TiO_2$) are exemplified as the free abrasive grain use in this invention.

A particle diameter (size) of the free abrasive grain can be suitably adjusted in dependency upon a desired surface roughness. An average particle diameter preferably falls within the range between 0.02 $\mu$m and 3.0 $\mu$m.

Preferred density of the island portions and a tip shape of the island portion, which contacts with the magnetic recording medium, can be obtained by selecting such a range of the particle diameter. Consequently, higher CSS durability can be obtained in the substrate for the magnetic recording medium.

When the particle diameter is not exceeding 0.02 $\mu$m, aggregation of the polishing material readily occurs, and the number of the remaining substances after the washing step becomes high. This is not preferable. On the other hand, when the particle diameter exceeds 3.0 $\mu$m, the roughness after the etching process becomes excessively large. This is not also desirable.

According to the fourth invention, the heating temperature in the heating process step preferably falls within the range between 30° C. and 180° C.

When the heating temperature is not exceeding 30° C., the heating process time becomes long, and production tact is extended. This is not preferable. On the other hand, when the heating temperature exceeds 180° C., the solvent, which endures the heating process of long time, is limited, and a large equipment is necessary to perform the process. This is not also desirable.

Further preferred range of the heating temperature falls within the range between 60° C. and 120° C. For example, the heating process time may be suitably adjusted in accordance with the kinds of used solvent in the case of the solvent. Specifically, the heating process time may fall within the range between 30 and 600 sec.

According to the fifth invention, the heating process is preferably carried out by the use of at least one selected from the group consisting of hot water, heated sulfuric acid, heated glycerin, and heated phosphoric acid. Among them, the heated sulfuric acid is desirable because the variation of the surface roughness becomes small. Namely, contaminants attached to the glass substrate can simultaneously removed during the process due to the heated sulfuric acid.

The concentration falls within the range between 5 wt % and 99 wt %, the heating temperature falls within the range between 30° C. and 180° C., and the process time falls within the range between 30 sec and 600 sec as the conditions processed by the heated sulfuric acid.

In this event, the concentration of the used sulfuric acid is preferably higher, and dense sulfuric acid having 75 volume % or more, and more preferably, 95 volume % or more, is desirable.

Further, the contaminants attached to the glass substrate can be also removed by the heated phosphoric acid.

The heating temperature falls within the range between 30° C. and 90° C., the process time falls within the range between 60 sec and 600 sec, and the concentration falls within the range between 0.1% and 50% as the conditions processed by the heated phosphoric acid.

Alternatively, organic acid other than the phosphoric acid may be used. The phosphoric acid is superior in operability in comparison with the sulfuric acid. Further, the sulfuric acid is superior in an effect for reducing the roughness in comparison with the phosphoric acid.

According to the sixth invention, the glass substrate preferably contains at least alkali metal oxide and alkali earth oxide, and the content of the alkali earth oxide is not exceeding 3 mol %.

Namely, it is assumed that an exchange reaction occurs between $H^+$ contained in the water and alkali ion ($Na^+$, $Li^+$) contained in the glass in the polishing step due to the free abrasive grain of the glass substrate surface.

By this exchange reaction, a hydration layer, which is readily etched, is formed. In the hydration layer, OH was attached to Si or Al which forms a network of the glass by the exchange reaction. It is assumed that the stress distribution was formed for the hydration layer in accordance with the stress distribution applied by the free abrasive grain, and the roughness was formed in dependency upon the etching rate.

Herein, it is to be noted that the etching rate is small at a portion having large stress while the etching rate is large at a portion having a small stress.

From such a mechanism, at least the alkali metal oxide is necessary to form the hydration layer in the glass substrate. Further, it is required that the content of the alkali earth oxide, which prevents the exchange reaction of the alkali ions for forming the hydration layer, is not exceeding 3 mol % (not exceeding 2.4 weight %), as disclosed in Japanese Patent Application No. H11-233209.

The glass substrate of the sixth invention preferably contains $SiO_2$ between 58 and 75 weight %, $Al_2O_3$ between 5 and 23 weight %, $Li_2O$ between 3 and 10 weight %, and $Na_2O$ between 4 and 13 weight % as main components like the seventh invention.

Further, it is desirable that the glass does not contain alkali earth metal oxide, such as, CaO or MgO to remarkably form the island (peak) by the mechanism mentioned above.

In particular, it is preferable in the eighth invention that the glass substrate is an aluminosilicate glass which contains 62–75 weight % of $SiO_2$, 5–15 weight % of $Al_2O_3$, 4–10 weight % of $Li_2O$, 4–12 weight % of $Na_2O$, and 5.5–15 weight % of $ZrO_2$ as the main components, the weight ratio of $Na_2O/ZrO2$ falls within the range between 0.5 and 2.0, and the weight ratio of $Al_2O_3/ZrO_2$ falls within the range between 0.4 and 2.5.

The transverse bending strength is increased, the compressive stress layer becomes deep, the Knoop hardness is excellent, and the controllability of the etching in the surface process due to the hydrosilicofluoric acid is excessively superior by chemically chemically strengthening the aluminosilicate glass.

Therefore, such an aluminosilicate glass is desirable. Herein, it is to be noted that N5 manufactured by HOYA CORPORATION is representative of the above-mentioned aluminosilicate glass.

Further, the surface process due to the above hydrosilicofluoric acid is performed twice. Moreover, the different hydrosilicofluoric acid concentrations are used in the respective steps. Thereby, the fine surface roughness on the substrate surface can be controlled.

It is preferable that the chemical strengthening process is carried out after chemical surface process or the surface process due to the hydrosilicofluoric acid (the ninth invention). Herein, the known chemical strengthening methods are used as the above chemical strengthening method without limitation.

For example, the low-temperature ion exchange method, in which the ion exchange is performed in the region which does not exceed the transition point temperature from the viewpoint of the glass transition point, is preferable. A fused salt used for the chemical strengthening includes potassium nitrate, sodium nitrate, nitrate mixed with them.

When the above surface process due to the hydrosilicofluoric acid is performed immediately after the glass substrate surface is chemically strengthened, the remaining distortion formed by the free abrasive grains on the glass substrate surface is buried in the stress of the chemical strengthening by chemically strengthening. This is undesirable because the surface roughness can not be controlled.

However, the same result as the above-mentioned case can be obtained by interposing the polishing processing step due to the free abrasive grains between (immediately after the surface process due to the hydrosilicofluoric acid) the chemical strengthening process step and the surface process due to the hydrosilicofluoric acid as the chemical strengthening step→the polishing step due to the free abrasive grains→the surface process due to the hydrosilicofluoric acid.

According to the tenth invention, at least the magnetic layer is formed on the principal surface of the glass substrate manufactured by the method of manufacturing the glass substrate for the magnetic recording medium, such as, the above-mentioned magnetic disk.

Thereby, the magnetic recording medium, such as, the magnetic disk satisfies the high electromagnetic conversion characteristic and the high CSS durability characteristic.

Rmax, Ra, Rp and Rq are measured by the use of the interatomic force microscope (AMF), and are defined by JIS standard (JIS B 0601).

In this case, Rmax is defined as a maximum height representative of a difference between a highest point and a lowest point. Ra is representative of a center-line mean roughness (an average of an absolute value of deviation between a center line and a measuring line).

Rp is representative of a maximum height of a highest point (a distance between an average line and a highest point). Rq is representative of a root mean square roughness (a root of an average square value of deviation between a center line and a measuring line).

Herein, this roughness can be determined by suitably setting a measuring region. Meanwhile, it is to be noted that a roughness data of the following examples corresponds to a data of a region of 5 μm□.

When the roughness exceeds an upper value of Rmax and Rp, the head flying height becomes high. This is not preferable from the viewpoint of the high recording/reproducing density.

When the roughness exceeds an upper value of Rmax/Ra and Rp/Ra, the head crush or the thermal asperity readily takes place. This is not desirable. When the roughness is not exceeding a lower value of Rmax, Rp, Rmax/Ra, and Rp/Ra, the head stiction may occur and, it is impossible to manufacture the glass substrate. This is not preferable.

DESCRIPTION OF THE PREFERRED EMBODIMENTS

EXAMPLE 1

Figure 1:
FIG. 1 is a schematic cross sectional view showing projections in a conventional glass substrate for a magnetic disk.
Figure 2:
FIG. 2 is a schematic cross sectional view showing projections in a glass substrate for a magnetic disk according to an embodiment of this invention.
Figure 3:
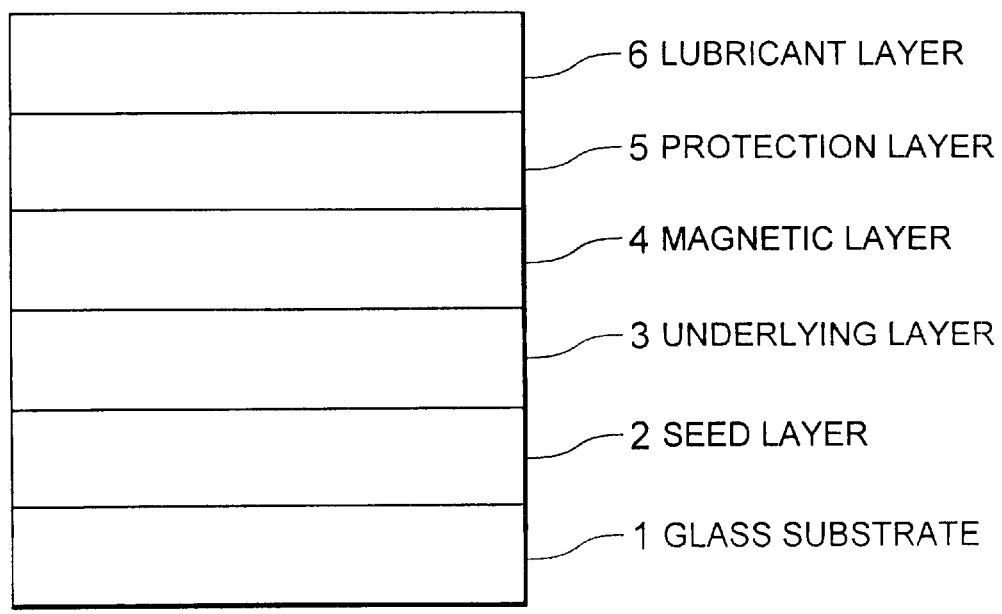
FIG. 3 is a schematic view showing a magnetic disk according to an embodiment of this invention.

As illustrated in FIG. 1, a seed layer 2, an underlying layer 3, a magnetic layer 4, a protection (protective) layer 5 and a lubricant layer 6 are successively formed on a glass substrate 1 in a magnetic disk according to this embodiment.

The glass substrate 1 is an aluminosilicate glass which has composition of 63.5 weight % of $SiO_2$, 14.2 weight % of $Al_2O_3$, 10.4 weight % of $Na_2O$, 5.4 weight % of $Li_2O$ and 6.0 weight % of $ZrO_2$, 0.4 weight % of $Sb_2O_3$, and 0.1 weight % of $AS_2O_3$, and is processed to the disk shape having outer diameter (65 mmφ), hole diameter (20 mmφ) of a central portion and a thickness of 0.635 nm.

After the both principle surfaces, end surfaces and chamfered portions are precisely polished, are thermally processed by dipping into heated solvent (specifically, sulfuric acid), and are processed the surfaces by the use of hydrosilicofluoric acid.

Consequently, the surface roughness of the both principle surfaces was specified by Ra=0.44 nm, Rmax=4.43 nm, Rp=2.75 nm, Rmax/Ra=10.1, Rp/Ra=6.25, Rq=0.55 nm.

The seed layer 2 is a NiAl (Ni: 50 at %, Al: 50 at %) film having the thickness of 40 nm. The seed layer 2 has small crystal grain diameter and is superior in uniformity. In consequence, each of the underlying layer 3 and the magnetic layer 4 formed thereon has fine crystal grain diameter. Thereby, the seed layer 2 serves to reduce noise.

As the seed layer 2, NiAlRu, NiAlNd, NiAlW, NiAlTa, NiAlHf, NiAlMo, NiAlCr, NiAlZr, NiAlNb, CrTi, FeAl, and FeCo, in which the other elements are added in addition to the NiAl other than the above-mentioned NiAl, are exemplified.

The underlying layer 3 is a CrMo (Cr: 94 at %, Mo: 6 at %) film having the film thickness of 25 nm. In the underlying film 3, it is desirable that difference of crystal lattice distance of the magnetic layer 4 formed thereon is reduced as possible, and the underlying layer 3 serves to improve coercive force.

Cr and CrV are exemplified other than the above-mentioned CrMo as the underlying layer 3. It is preferable to match with the lattice distance of the seed layer 2 because the crystal growth becomes excellent and the electromagnetic conversion characteristic also becomes superior.

In this event, the underlying layer 3 is not restricted to a single layer, and may be a multi-structure in which the same or the different layers are laminated. For example, a multi-layer underlying layer, such as, Cr/CrMo, Cr/CrV, and CrV/CrV are exemplified.

The magnetic layer is a CoPtCrTa (Co: 75 at %, Cr: 17 at %, Pt: 5 at %, Ta: 3 at %) film. Herein, it is to be noted that material of the magnetic layer of the magnetic disk of this invention is not particularly restricted. Specifically, a magnetic thin-film, such as, CoPt, CoCr, CoNiCr, CoCrTa, CoPtCr, CoNiPt, CoNiCrPt, CoNiCrTa, and CoCrTaPtNb, which contains Co as a main component, is exemplified as the magnetic layer 4.

Alternatively, a multi-structure (for example, CoCrPtTa/CrMo/CoCrPtTa), which is formed by dividing the magnetic layer with a non-magnetic film (for example, Cr, CrMo, CrV) to reduce the noise, may be used as the magnetic layer 4.

Further, the magnetic layer 4 may be granular having such a structure that magnetic particles, such as, Fe, Co, FeCo, and CoNiPt, are dispersed in a non-magnetic film consisting of material, such as, ferrite based material, iron-rare earth-based material or $SiO_2$, BN other than the above-mentioned Co based material.

Moreover, the magnetic layer 4 may be a recording form of an in-plane type or a vertical type. The protection layer 5 is a hydrogenation carbon (H: 30 at %) film having the film thickness of 10 nm. The protection film 5 achieves corrosion resistance and resistance to abrasion of the magnetic layer 4.

As the protection layer 5, carbon, nitrogen carbon, hydrogen nitrogen carbon, fluorine carbon, Cr, and $SiO_2$ are exemplified other than the above-mentioned hydrogenation carbon.

The lubricant layer 6 is a liquid lubricant film consisting of perfluoropolyether having the film thickness of 1 nm. The lubricant layer 6 achieves resistance to abrasion.

In addition, fluorocarbon based liquid lubricant material or a lubricant material consisting of alkali metal salt of sulfonic acid may be used as the material of the lubricant layer 6 other than the above-mentioned perfluoropolyether.

In this event, if the protection layer 5 has function as a solid lubricant material, the lubricant layer 6 can be omitted.

Hereinafter, description will be made about a method of manufacturing the above-mentioned magnetic disk and glass substrate for use in the magnetic disk.

Step of Producing Glass Substrate for Magnetic Disk (1) Roughing step:

First, a glass substrate of an aluminosilicate glass was cut into a disc-shape having a diameter of 66 mm and a thickness of 3 mm by a grinding stone from a sheet glass formed by the down draw method. The glass substrate was ground by a relatively rough diamond grindstone to obtain the glass substrate having the diameter of 66 mm and the thickness of 1.5 mm.

In this event, the glass substrate may be cut into the disc-shape in the same manner as the above from the sheet glass formed by the float method instead of the above-mentioned down draw method.

A chemically strengthened glass was used as the above-mentioned aluminosilicate glass. The chemically strengthened glass contains 63.5 weight % of $SiO_2$, 14.2 weight % of $Al_2O_3$, 10.4 weight % of $Na_2O$, 5.4 weight % of $Li_2O$ and 6.0 weight % of $ZrO_2$, 0.4 weight % of $Sb_2O_3$, and 0.1 weight % of $As_2O_3$.

Subsequently, the both principal surfaces of the glass substrate were ground by a diamond grindstone having grains smaller than those of the above-mentioned grindstone at every one surface.

In this case, a load was set to the extent of 100 Kg. Thereby, the both principal surfaces of the glass substrate were ground into a surface roughness Rmax of about 10 μm.

Next, an opening was formed at a center portion of the glass substrate by using a cylindrical grindstone. Further, the outer side end surface was ground to a diameter of 65 mm.

Thereafter, the outer and the inner end surfaces were chamfered. In this case, the end surface (the side surface and the chamfered portion) of the glass substrate had a surface roughness Rmax of about 4 μm.

(2) Mirror finishing step of the end surface:

Subsequently, the glass substrate was polished by the use of a brush polishing by rotating the glass substrate so that the surface roughness of the end surface portion (the angular portion, the side surface and the chamfered portion) of the glass substrate is set to about 1 μm by Rmax and to about 0.3 μm by Ra. The mirror finishing step is effective for preventing a film defect which is caused by dusts which are attached to the principal surface of the glass substrate.

In this event, the dusts are generally generated from the end surface of the glass substrate when the glass substrate is transferred or when the glass substrate is cleaned. The glass substrate was washed with water after the above-mentioned mirror finishing step.

(3) Lapping step:

The lapping step was performed for the glass substrate to improve dimension and shape accuracy. The lapping step was carried out by using the known lapping apparatus. In this case, the lapping step was conducted two times by changing grain degree from #400 to #1000.

Specifically, the lapping was performed for the both principal surfaces of the glass substrates which were contained in a carrier so that the principal surfaces had a surface accuracy of 0–1 μm and the surface roughness (Rmax) of about 6 μm.

In this event, the lapping was carried out by rotating an inner gear and an outer gear by the use of alumina grains having a grain degree of #400 in the condition that the load L was kept at about 100 Kg.

Next, the lapping was performed by changing the grain degree of the alumina grain into #1000. In this case, the surface roughness (Rmax) was set to about 2 μm. Subsequently, the glass substrate was successively immersed in washing units of natural detergent and water to be washed after the lapping step was completed.

(4) First polishing step:

Next, a first polishing step was performed by the use of a polishing apparatus to remove a defect and a distortion remaining in the above-mentioned lapping process. Specifically, a hard polisher (which may be a cerium pad LP66 made by Lodes) was used as polisher. In this case, the first polishing was performed under the following polishing condition.

Polishing liquid: oxide cerium (grain size of 1.3 μm) (free abrasive grain)+water Load: 80–100 g/cm$^2$
Polishing time: 30–50 minutes
Removing amount: 35–45 μm
Revolution of lower surface plate: 40 rpm
Revolution of upper surface plate: 35 rpm
Revolution of inner gear: 14 rpm
Revolution of outer gear: 29 rpm The glass substrate was washed by being successively dipped in washing units of natural detergent, pure water, pure water, IPA (isopropyl alcohol), IPA (vapor drying) after the above polishing step. Herein, supersonic wave was applied to each washing unit.

In this event, the washing step may be omitted if a polishing liquid in the subsequent second polishing step is the same as the above case.

Further, the hard polisher used in the first polishing step is not particularly restricted, and may be suitably selected in dependency upon the surface roughness and end portion shape of the substrate as the target (or the goal)

(5) Second polishing step (Final polishing step):

Next, a second polishing was conducted by changing the above-mentioned hard polisher into a soft polisher (Kanebou N7519) by using the polishing apparatus used in the first polishing step.

The polishing condition is similar to the first polishing step except for polishing liquid of oxide cerium (grain size of 0.8 μm) (free abrasive grain)+water, the load of 80–100 g/cm$^2$, the polishing time of 9–15 minutes and the removing amount of 3–5 μm.

The surface roughness of the glass substrate obtained in this second polishing step was measured by the use of the interatomic force microscope (AFM). Consequently, Ra was equal to 0.4 nm while Rmax was equal to 9.3 nm. Herein, it is to be noted that the soft polisher used in the second polishing step is not particularly restricted.

In this event, it is desirable to use polisher having relatively small hardness to form a projection formed via the subsequent surface processing step to an island shape. Herein, the hardness (Asker C) of the polisher may preferably be 60 or less, and more preferably, 55 or less.

(6) Heat processing step:

A heating process was carried out by dipping the glass substrate after the second polishing step into sulfuric acid (temperature: 100° C.×5 min) having concentration of 96 weight % or more.

(7) Surface processing step due to hydrosilicofluoric acid (Washing step)

The glass substrate was successively immersed in each processing (washing) unit of hydrosilicofluoric acid (concentration: 0.35%, temperature: 45° C., immersing time: 150 sec), hydrosilicofluoric acid (concentration: 0.28%, temperature: 45° C., immersing time: 200 sec) to be processed (washed) the surface therein after the second polishing step. In this case, a supersonic wave was applied to each of the processing (washing) units.

The glass substrate was washed by being successively dipped in each washing unit of natural detergent, pure water, IPA (isopropyl alcohol), IPA (vapor drying) after the above surface processing step. Herein, supersonic wave was applied to each washing unit except for an IPA vapor unit used in the IPA (vapor drying) step.

(7) Chemical strengthening step:

Next, a chemical strengthening step was performed for the glass substrate after the grinding, the surface polishing processing (washing) and the washing step were completed.

First, a chemical strengthening salt was prepared by mixing potassium nitrate (60%) with sodium nitrate (40%). The chemical strengthening salt was heated up to 400° C. The glass substrate which was washed and preheated to 300° C. was dipped in the chemical strengthening salt for 3 hours.

The chemical strengthening step was carried out in a holder so that the entire surface of the glass substrate was chemically strengthened with a plurality of glass substrates retained at the end surface in the holder.

Under this circumstances, lithium ions and sodium ions on a surface layer of the glass substrate were replaced by sodium ions and potassium ions in the chemical strengthening salt by dipping each glass substrate in the chemical strengthening salt. Thus, the glass substrate was chemically strengthened.

A compressive stress layer formed in the surface layer of the glass substrate had a thickness of about 100 to 200 $\mu$m. Next, the chemically strengthened glass substrate was dipped in a water tank of 20° C., quickly cooled and retained for 10 minutes.

(8) Washing step:

Subsequently, the cooled glass substrate was dipped in a sulfuric acid heated up to 40° C., and was washed in the condition that the supersonic wave was applied. The surface of the glass substrate obtained thus was inspected. As a result, no contaminant was detected.

In this event, the surface roughness of the principal surface of the glass substrate after the above-mentioned washing step was measured by the use of the interatomic force microscope (AFM).

As a result, the surface roughness was specified by Ra=0.44 nm, Rmax=4.43 nm, Rp=2.75 nm, Rmax/Ra=10.1, Rp/Ra=6.25, and Rq=0.55 nm.

In this case, Ra is representative of the center-line mean roughness (defined in Japanese Industrial Standard JIS B0601) while Rmax is defined as a maximum height representative of a difference between a highest point and a lowest point (defined in Japanese Industrial Standard JIS B0601).

Further, observation was made about the surface state of the principal surface of the glass substrate after the final polishing step and the surface state of the principal surface of the glass substrate after the washing step by the AFM.

Consequently, it was confirmed that islands (peaks) were formed at a portion of a trace of free abrasive grain in the final polishing step.

Particularly, it is assumed that a portion having a relatively high remaining distortion forms the islands (peaks) in remaining stress distribution formed on the glass principal surface by the free abrasive grain.

Step of Producing Magnetic Disk

Subsequently, a heat treatment of the glass substrate 1, deposition of a seed layer 2, deposition of an the underlying layer 3, deposition of a magnetic layer 4 and deposition of the protection layer 5 were successively carried out for the above-mentioned glass substrate 1 for the magnetic disk by the use of the known in-line sputtering apparatus.

The in-line type sputtering apparatus (not shown) has a first chamber in which a substrate heater is arranged, a second chamber in which a NiAl target (Ni: 50 at %, Al: 50 at %), a CrMo target (Cr: 94 at %, Mo: 6 at %) and a CoCrPtTa target (Co: 75 at %, Cr: 17 at %, Pt: 5 at %, Ta: 3 at %) are successively arranged, a third chamber in which a carbon target is arranged, along the moving direction.

With such a structure, the glass substrate 1 was introduced into the first chamber via a load lock chamber. The glass substrate was successively transferred into the respective chambers by a desired carrier apparatus at a constant rate to deposit and process in the following conditions.

Namely, the substrate was heated to 350° C. for 2 minutes in the first chamber. The NiAl film having the film thickness of 40 nm as the seed layer 2, the CrMo film having the film thickness of 25 nm as the underlying layer 3, the CoCrPtTa film having the film thickness of 27 nm as the magnetic layer 4 are successively deposited in the second chamber. The hydrogenation carbon film having the film thickness of 10 nm as the protection layer 5 is deposited in the third chamber.

In this case, the sputtering conditions in the second and third chambers were as follows.

Namely, the sputtering pressure was 2 mTorr in the second chamber while the sputtering pressure was 3 mTorr in the third chamber. An inactive gas of argon was used as the sputtering atmosphere in the second chamber. A mixed gas in which 8% of hydrogen is mixed into the inactive gas of argon was used as the sputtering atmosphere in the third chamber.

In this event, the sputtering power was 2 kW in the second chamber while the sputtering power was 3 kW in the third chamber.

Subsequently, the substrate having the protection layer 5 was taken out from the in-line sputtering apparatus. Perfluoropolyether is applied to the surface of the protection layer 5 by the dipping process. Thereafter, the lubricant layer 6 having the film thickness of 1 nm was formed to obtain the magnetic disk of the CSS system according to an example 1.

Evaluation results of the electromagnetic conversion characteristic and the CSS durability characteristic of the obtained magnetic disk is represented as follows. In this event, the magnetic characteristic and the record/reproduce characteristic were measured, and as a result, an excellent result was obtained. Specifically, the coercive force was 2300 Oe and the S/N ratio was 20 dB.

In this case, the coercive force was measured by the use of the known vibration sample type magnetometer at a maximum external applying magnetic field of 10 KOe by cutting a sample of 8 mm $\phi$ from the manufactured magnetic disk and applying the magnetic field in the film surface direction.

Moreover, the record/reproduce characteristic (S/N ratio) was measured as follows.

Namely, the obtained magnetic disk and the MR (magneto-resistive type) head having the flying height of 0.055 $\mu$m were used. In this event, the record/reproduce characteristic in a line recording density of 163 kfcl (line recording density of 163,000 bits per 1 inch) was measured in the condition that a relative rate between the MR head and the magnetic disk was set to 9.6 m/s.

Further, medium noise during recording/reproducing signals was measured by the use of the known spectrum analyzer to calculate the S/N ratio in the condition that carrier frequency was set to 23 MHz and measuring bandwidth was set to 26 MHz. The MR head, which was used in the above-mentioned measurement, had a track width of 3.1/2.4 $\mu$m and a magnetic head gap length of 0.35/0.28 $\mu$m at write/read sides.

Further, stiction between the magnetic disk and the magnetic head did not occur in the CSS durability test of 10 tens thousand with the rotating rate of the magnetic disk of 4000 rpm using 30% slider of 3 g load in atmosphere of the room temperature and the room moisture.

Moreover, the head crush did not occur. As a result, the magnetic disk having the high CSS durability characteristic was obtained.

Further, the static coefficient of friction between the magnetic disk and the magnetic head was measured by the use of the strain gage, and it was 0.6.

Subsequently, the glide height test was carried out by the use of the AE sensor. It has been confirmed that no contact was generated between the head and the medium up to the head flying quantity of $1.0\mu$ inch. That is, the glide height of this disk was $1.0\mu$ inch.

EXAMPLES 2–3

The glass substrate was manufactured in the same manner as the example 1 except that hot water (90° C.×3 min) (example 2) and heated glycerin (90° C.×3 min) (example 2) were used as the solvent in the above-mentioned heating process step.

When the surface roughness of the obtained glass substrate for the magnetic recording medium was measured by the use of the interatomic force microscope (AFM), the surface roughness was specified by Ra=0.35 nm, Rmax= 4.72 nm, Rp=3.10 nm, Rmax/Ra=13.5, Rp/Ra=8.86, Rq=0.52 nm (example 2), and, Ra=0.39 nm, Rmax=5.22 nm, Rp=3.75 nm, Rmax/Ra=13.4, Rp/Ra=9.62, and Rq=0.55 nm (example 3).

Further, the magnetic recording medium of the CSS system was fabricated as the same manner as the example 1, and the CSS durability test, the glide test, and the measurement of the coefficient of friction were performed. As a result, an excellent result was obtained.

Comparative Example 1

Subsequently, the glass substrate for the magnetic recording medium of the CSS system was manufactured in the same manner as the example 1 except that the heating process step was not conducted.

When the surface roughness of the obtained glass substrate for the magnetic recording medium was measured by the use of the interatomic force microscope (AFM), the surface roughness was specified by Ra=1.00 nm, Rmax= 6.73 nm, Rp=4.2 nm, Rmax/Ra=6.73, Rp/Ra=4.2, Rq=1.18 nm. In comparison with the above-mentioned example, the surface roughness became rougher, and the projection density was increased.

Further, the magnetic recording medium of the CSS system was fabricated as the same manner as the example 1, and the CSS durability test, the glide test, and the measurement of the coefficient of friction were performed. As a result, the glide height was high ($1.2\mu$ inch) compared to the example 1.

EXAMPLES 4–7

Comparative Examples 2–3

Next, the glass substrate for the magnetic recording medium of the CSS system was manufactured in the same manner as the example 1 (sulfuric acid) except that the heating condition (temperature) in the heating process were changed into 30° C. (example 4), 60° C. (example 5), 120° C. (example 6), 180° C. (example 7), 28° C. (comparative example 2), and 190° C. (comparative example 3), and the process time was suitably adjusted.

In consequence, an effect of the heating process is low, the projections are formed in the same manner as the comparative example 1, and the low flying height of the magnetic head is not be achieved in the case of 28° C. (comparative example 2). This is not preferable.

The solvent, which endures the heating process of long time is and usable, is limited, a large equipment is necessary to perform the process, and operability is degraded in the case of 190° C. (comparative example 3). This is not desirable.

Namely, it is found out that from the above results that the heating temperature in the heating process preferably falls within the range between 30° C. and 180° C.

EXAMPLE 8

Comparative Examples 4–5

The magnetic disk was manufactured in the same manner as the example 1 except that the glass substrate was changed into an aluminosilicate glass (example 8), a quartz glass (comparative example 4) and a soldalime glass (comparative example 5), and the polishing condition for setting the surfaces of these glass substrates to desired surface roughness and the surface processing condition due to the hydrosilicofluoric acid were suitably changed.

In this case, the aluminisilicate glass used in the above-mentioned example 8 had composition of 64.0 weight % of $SiO_2$, 16.0 weight % of $Al_2O_3$, 9.0 weight % of $Na_2O$, 7.0 weight % of $Li_2O$ and 4.0 weight % of $ZrO_2$.

On the other hand, the solalime glass used in the above-mentioned comparative example 5 had composition of 72.5 weight % of $SiO_2$, 15.0 weight % of $Na_2O$, 1.0 weight % of $Al_2O_3$, 9.0 weight % of CaO, and 2.5 weight % of MgO.

As a result, the surface roughness was specified by Ra=0.49 nm, Rmax=5.68 nm, Rp=3.23 nm, Rmax/Ra=11.6, Rp/Ra=6.59, and Rq=0.52 nm in the example 8. Further, the coefficient of friction was 1.9 and the CSS durability was also excellent.

However, the surface roughness of the comparative examples 4 and 5 was largely different in comparison with the above examples. Specifically, the static coefficient of friction was 3 or more and the superior result could not be obtained in the CSS durability characteristic.

Herein, examination has been made about a reason regarding differences between ways, in which the projection is formed, in dependency upon the kind of the glass (glass type, glass composition) from the results of the above-mentioned example and the comparative examples 4 and 5.

It is assumed that an exchange reaction occurs between $H^+$ contained in the water and alkali ion ($Na^+$, $Li^+$) contained in the glass in the polishing step due to the free abrasive grain of the glass substrate surface.

By this exchange reaction, a hydration layer was formed. In the hydration layer, OH was attached to Si or Al which forms a network of the glass by the exchange reaction. It is assumed that the distribution of the thickness of the hydration layer was formed in accordance with the stress distribution applied by the free abrasive grain in the hydration, and the roughness was formed in dependency upon the etching rate.

Herein, it is to be noted that the etching rate is small at a portion having large stress while the etching rate is large at a portion having a small stress.

The formation of the hydration layer relates with the roughness (projections) and depends upon the difference of the kind of the glass (glass type, glass composition).

Therefore, it is confirmed that the glass used in the manufacturing method according to this invention satisfies the above-mentioned condition and may contain 58–75 weight % of $SiO_2$, 5–23 weight % of $Al_2O_3$, 3–10 weight % of Li$_2$O, and 4–13 weight % of Na$_2$O as main components in the composition ratio and preferably does not contains alkali earth metal (oxide).

In particular, the aluminosilicate glass specified in the invention 7 is desirable in the above-mentioned polishing condition and the surface processing condition due to the hydrosilicofluoric acid.

EXAMPLE 9

The glass substrate for the magnetic recording medium for use in the ramp road system and the magnetic recording medium for use in the ramp load system were manufactured in the same manner as the example 1 (sulfuric acid) except that the heating condition in the above-mentioned heating process was set to 90° C., 6 min.

When the surface roughness of the obtained glass substrate for the magnetic recording medium was measured by the use of the interatomic force microscope (AFM), the surface roughness was specified by Ra=0.65 nm, Rmax= 6.02 nm, Rp=2.83 nm, Rmax/Ra=9.26, Rp/Ra=4.35, Rq=0.76 nm. Further, an excellent result was obtained in the glide test.

EXAMPLES 10–11

The glass substrate for the magnetic recording medium for use in the ramp road system and the magnetic recording medium for use in the ramp load system were manufactured in the same manner as the example 1 (sulfuric acid) except that the heating condition in the above-mentioned heating process was set to 90° C., 10 min (example 10), and 80° C., 5 min (example 11).

When the surface roughness of the obtained glass substrate for the magnetic recording medium was measured by the use of the interatomic force microscope (AFM), the surface roughness was specified by Ra=0.54 nm, Rmax= 4.31 nm, Rp=2.53 nm, Rmax/Ra=7.98, Rp/Ra=4.69, Rq=0.65 nm (example 10), Ra=0.85 nm, Rmax=6.43 nm, Rp=3.21 nm, Rmax/Ra=7.56, Rp/Ra=3.78, Rq=1.17 nm (example 11).

Further, an excellent result was obtained in the glide test.

EXAMPLE 12

The glass substrate for the magnetic recording medium for use in the ramp road system and the magnetic recording medium for use in the ramp load system were manufactured in the same manner as the example 1 (sulfuric acid) except that the solvent used in the heating process was changed from sulfuric acid into phosphoric acid (made by OHTOMO CHEMICAL INS., CORP.: SCHRECK #205 (1-hydroxy-ethane-1,1-diphosphoric acid)) 0.3%, 40° C., 90 seconds.

When the surface roughness of the obtained glass substrate for the magnetic recording medium was measured by the use of the interatomic force microscope (AFM), the surface roughness was specified by Ra=0.79 nm, Rmax= 6.43 nm, Rp=4.12 nm, Rmax/Ra=8.14, Rp/Ra=5.22, Rq=0.97 nm. Further, an excellent result was obtained in the glide test.

As mentioned above, it is found out that variation of the projection height is reduced in the examples 9–12 of the ramp load system in comparison with the examples 1–8 of the CSS system by suitably selecting the conditions of the heating process. Specifically, the value of Rmax/Ra and the value of Rp/Ra become low.

Although the invention has been so far explained with the preferred embodiments, this invention is not always restricted to the above-mentioned embodiments. For example, although the surface process due to the hydrosilicofluoric acid was performed twice, the surface process step may be performed once, and alternatively, may be performed three times or more.

The same effect as the above-mentioned case was obtained in an etching process due to solution containing hydrofluoric acid or an etching process, in which, the glass substrate is subjected to hydrofluoric acid vapor, instead of the hydrosilicofluoric acid.

Further, although the chemically strengthened glass substrate was used as the glass substrate of this invention, and the chemically strengthened step was performed after the surface process due to the hydrosilicofluoric acid, the surface process due to the hydrosilicofluoric acid may be carried out after the chemically strengthened process.

When the glass substrate is polished by the use of the free abrasive grain and the above surface process due to the hydrosilicofluoric acid is performed immediately after the glass substrate surface is chemically strengthened, the remaining distortion formed by the free abrasive grain on the glass substrate surface is buried in the stress of the chemical strengthening. This is undesirable because the surface roughness can not be controlled.

However, the same result as the above-mentioned case can be obtained by interposing the polishing processing step due to the free abrasive grain between (immediately after the surface process due to the hydrosilicofluoric acid) the chemical strengthening process step and the surface process due to the hydrosilicofluoric acid as the chemical strengthening step→the polishing step due to the free abrasive grain→the surface process due to the hydrosilicofluoric acid.

Further, the disk manufactured by this invention is not restricted to the CSS system, and may be usable in the load/unload system (the ramp load system), and in particular, can be suitably used in the load/unload system (the ramp load system).

As mentioned before, according to this invention, the project height can be reduced in comparison with such a case that the heating process is not carried out. Further, the projection density, the variation of the projection heights, and the variation of the projections can be reduced. Consequently, the glide height of 1.2$\mu$ inch and the high electro-magnetic conversion characteristic can be realized.

Moreover, the magnetic recording medium, which is suitable for the load/unload system, can be manufactured by controlling the projection height and the projection density according to this invention. In such a load/unload system, the projection height and the projection density fall within the predetermined range and the head is positioned outside of the disk when the disk is not rotated.

In addition, the magnetic recording medium, which satisfies the sufficient electro-magnetic conversion characteristic and the stiction preventing effect of the magnetic head at the same time and which is suitable for the CSS system superior in the high CSS durability, can be manufactured according to this invention.

What is claimed is:

1. A method of manufacturing a glass substrate for a magnetic recording medium for forming a predetermined roughness, comprising the steps of:

precisely polishing a principal surface of the glass substrate by the use of polishing material containing free abrasive grain, generating remaining stress distribution for a portion of a polishing trace due to the free abrasive grain on the surface of the glass substrate, performing a surface process for at least the principal surface of the glass substrate by the use of hydrosilicofluoric acid, and deciding a portion having relatively high remaining distortion in the generated remaining stress distribution as an island portion, the glass substrate being heated after precisely polishing before performing the surface process by the use of the hydrosilicofluoric acid.

2. A method of manufacturing a glass substrate for a magnetic recording medium for forming a predetermined roughness, comprising the steps of:

precisely polishing a principal surface of the glass substrate by the use of polishing material containing free abrasive grain, generating remaining stress distribution for a portion of a polishing trace due to the free abrasive grain on the surface of the glass substrate, chemically processing at least the principal surface of the glass substrate, and deciding a portion having relatively high remaining distortion in the generated remaining stress distribution as an island portion, the glass substrate being heated by dipping the glass substrate in heated solvent after precisely polishing but before chemically processing the principal surface.

3. A method as claimed in claim 2, wherein:

the chemical surface process comprises any one of an etching process by the use of solution containing hydrofluoric acid, solution containing hydrosilicofluoric acid, and alkali solution.

4. A method as claimed in any one of the claim 1 or 2, wherein:

heating temperature in the heating process step falls within the range between 30° C. and 180° C.

5. A method as claimed in any one of the claim 1 or 2, wherein:

the heating process is carried out by the use of at least one selected from the group consisting of hot water, heated sulfuric acid, heated glycerin, and heated phosphoric acid.

6. A method as claimed in any one of the claim 1 or 2, wherein:

the glass substrate contains at least alkali metal oxide and alkali earth oxide, and content of the alkali earth oxide is not exceeding 3 mol %.

7. A method as claimed in claim 6, wherein:

the glass constituting the glass substrate contains $SiO_2$ between 58 and 75 weight %, $Al_2O_3$ between 5 and 23 weight %, $Li_2O$ between 3 and 10 weight %, and $Na_2O$ between 4 and 13 weight % as main components.

8. A method as claimed in claim 7, wherein:

the glass contains $SiO_2$ between 62 and 75 weight %, $Al_2O_3$ between 5 and 15 weight %, $Li_2O$ between 4 and 10 weight %, $Na_2O$ between 4 and 12 weight %, and $ZrO_2$ between 5.5 and 15 weight % as main components, and weight ratio of $Na_2O/ZrO_2$ falls within the range between 0.5 and 2.0 while weight ratio of $Al_2O_3/ZrO_2$ falls within the range between 0.4 and 2.5.

9. A method as claimed in any one of claim 1, 2, 3, 4, 5, 6 or 7, wherein:

a chemical strengthening process is carried out after the surface process using a hydrosilicofluoric acid.

10. A method of manufacturing a magnetic recording medium, wherein:

at least a magnetic layer is formed on the principal surface of the glass substrate manufactured by the method claimed in any one of claim 1 or 2.

* * * * *